United States Patent
Kanai

(10) Patent No.: US 9,566,973 B2
(45) Date of Patent: Feb. 14, 2017

(54) CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventor: Hiroshi Kanai, Susono (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 20 days.

(21) Appl. No.: 14/644,550

(22) Filed: Mar. 11, 2015

(65) Prior Publication Data
US 2015/0274153 A1 Oct. 1, 2015

(30) Foreign Application Priority Data
Mar. 25, 2014 (JP) ................. 2014-062315

(51) Int. Cl.
*B60W 10/08* (2006.01)
*B60W 20/15* (2016.01)
(Continued)

(52) U.S. Cl.
CPC ........... *B60W 10/08* (2013.01); *B60W 10/06* (2013.01); *B60W 20/15* (2016.01); *B60W 20/40* (2013.01); *F02D 13/0238* (2013.01); *F02D 19/084* (2013.01); *F02D 19/087* (2013.01); *F02D 29/02* (2013.01); *F02D 41/0025* (2013.01); *F02D 41/064* (2013.01); *F02D 2200/0611* (2013.01); *Y02T 10/18* (2013.01); *Y02T 10/36* (2013.01); *Y10S 903/93* (2013.01); *Y10T 477/23* (2015.01)

(58) Field of Classification Search
None
See application file for complete search history.

(56) References Cited

U.S. PATENT DOCUMENTS 6,338,331 B1  1/2002  Watanabe et al.
2002/0123831 A1  9/2002  Nakagawa et al.
(Continued)

FOREIGN PATENT DOCUMENTS

JP  H08-61157 A  3/1996
JP  2000-265880 A  9/2000
(Continued)

*Primary Examiner* — Ramya Burgess
*Assistant Examiner* — Timothy M Hannon
(74) *Attorney, Agent, or Firm* — Andrews Kurth Kenyon LLP

(57) ABSTRACT

Control apparatus for internal combustion engine in which alcohol fuel can be used includes: acquisition unit for acquiring alcohol concentration of fuel; electric motor for driving internal combustion engine; and a control unit configured to control the internal combustion engine and the electric motor. The control unit is configured, when the running time from a low-temperature start to the stoppage of the internal combustion engine or a parameter increasing with an increase of the running time is equal to or lower than a predetermined value, to cause, after the stoppage of the internal combustion engine, the electric motor to subject the internal combustion engine to motoring and to set the motoring time of the motoring to be shorter when a fuel alcohol concentration acquired by the acquisition unit is relatively high compared to when a fuel alcohol concentration acquired by the acquisition unit relatively is low.

7 Claims, 15 Drawing Sheets

(51) Int. Cl.
*F02D 19/08* (2006.01)
*F02D 13/02* (2006.01)
*F02D 29/02* (2006.01)
*B60W 20/40* (2016.01)
*F02D 41/00* (2006.01)
*B60W 10/06* (2006.01)
*B60W 20/00* (2016.01)
*F02D 41/06* (2006.01)

(56) References Cited

U.S. PATENT DOCUMENTS

2004/0060549 A1 4/2004 Kobayashi et al.
2004/0079342 A1 4/2004 Kojima et al.

FOREIGN PATENT DOCUMENTS

| JP | 2002-256919 A |   | 9/2002 |
| JP | 2004-116402 A |   | 4/2004 |
| JP | 2004-144030 A |   | 5/2004 |
| JP | 2005-030285 A |   | 2/2005 |
| JP | 2007211659 A | * | 8/2007 |
| JP | 2008057386 A | * | 3/2008 |
| JP | 2008-075589 A |   | 4/2008 |
| JP | 2009-047071 A |   | 3/2009 |
| JP | 2009-156144 A |   | 7/2009 |
| JP | 2009264226 A | * | 11/2009 |

\* cited by examiner

CONTROL APPARATUS FOR INTERNAL COMBUSTION ENGINE

CROSS-REFERENCES TO RELATED APPLICATIONS

This application claims the benefit of Japanese Patent Application No. 2014-062315, filed Mar. 25, 2014, which is hereby incorporated by reference herein in its entirety.

BACKGROUND OF THE INVENTION

Field of the Invention

The present invention relates to a control apparatus for an internal combustion engine. In particular, the invention relates to the control apparatus for the internal combustion engine that can use alcohol fuel.

Description of the Related Art

Known internal combustion engines for vehicles or automobiles include a bifuel-type internal combustion engine that can use alcohol fuel as substitute fuel. A vehicle including such an internal combustion engine is called an FFV (Flexible Fuel Vehicle). In the internal combustion engine as described above, alcohol fuel such as methanol or ethanol as well as hydrocarbon fuel such as gasoline can be used individually or can be mixed together.

Japanese Patent Laid-Open No. 2009-47071 discloses a hybrid vehicle including a bifuel-type internal combustion engine in which the stoppage of an internal combustion engine is followed by the cranking of an internal combustion engine by a motor/generator to remove the residual moisture in an exhaust pipe by scavenging. The purpose of this is to exclude the adverse effect by the residual moisture due to the fact that the residual moisture causes a deteriorated catalyst warming performance during the restart of the internal combustion engine after the stoppage.

Japanese Patent Laid-Open No. 2002-256919 discloses a hybrid vehicle including a general internal combustion engine that is not the bifuel-type one. In this hybrid vehicle, during the fuel cutting in deceleration, a motor and a power generator are used to drive an engine to remove the residual exhaust gas in a range from the intake pipe to the catalyst by scavenging.

By the way, when the low-temperature start of the internal combustion engine is followed by the running for a relatively-short time (i.e. short trip), this generally causes, after the stoppage of the running, the condensation of water in the exhaust, thereby causing a large amount of aqueous droplets attached to the inner wall of an exhaust passage. When the internal combustion engine is the bifuel-type one in particular, the above tendency is remarkable because the combustion of alcohol fuel causes a higher amount of water when compared with the case of hydrocarbon fuel such as gasoline.

In such a case, the aqueous droplets attached to the inner wall of the exhaust passage may flow down and may be collected and frozen in a relatively-small space between an exhaust valve and a valve sheet. The ice due to this freezing is disadvantageous in that this ice is continuously attached to at least one of the exhaust valve and the valve sheet even after the subsequent restart of the internal combustion engine, thereby resulting in a defective opening of the exhaust valve.

According to one solution to this problem as disclosed in Japanese Patent Laid-Open No. 2009-47071, the stoppage of the internal combustion engine is followed by the cranking (or motoring) of the internal combustion engine by another motor to remove aqueous droplets attached to the inner wall of the exhaust passage by scavenging.

However, on the other hand, the motoring requires power consumption, thus requiring the motoring time of the motoring to be optimally set to the minimum required time.

With regard to this, Japanese Patent Laid-Open No. 2009-47071 discloses, from the viewpoint that an increase of the fuel alcohol concentration causes an increase of the residual moisture in the exhaust pipe is, to set a longer cranking period in accordance with the increase of the fuel alcohol concentration.

However, the technique disclosed in Japanese Patent Laid-Open No. 2009-47071 does not intend to solve the problem specific to the invention of this application as described above (i.e., the freezing due to the running for a relatively-shot time after the low-temperature start of the internal combustion engine and thus the defective opening of the exhaust valve after the restart due to this). Thus, even the application of the technique disclosed in Japanese Patent Laid-Open No. 2009-47071 cannot provide an optimal setting of the motoring time after the stoppage of the internal combustion engine.

The present invention has been made in view of the above situation. It is an objective of the invention to provide a control apparatus for an internal combustion engine that can optimally set the motoring time after the stoppage thereof in an internal combustion engine in which alcohol fuel can be used.

SUMMARY OF THE INVENTION

According to one embodiment of the present invention, a control apparatus for an internal combustion engine in which alcohol fuel can be used is provided. The control apparatus for the internal combustion engine includes:

an acquisition unit for acquiring an alcohol concentration of fuel, an electric motor for driving the internal combustion engine, and a control unit configured to control the internal combustion engine and the electric motor.

The control unit is configured so that, when the running time from a low-temperature start to the stoppage of the internal combustion engine or a parameter increasing with an increase of the running time is equal to or lower than a predetermined value, the electric motor is used after the stoppage of the internal combustion engine to provide the motoring of the internal combustion engine and the motoring time of the motoring is set to be shorter when the alcohol concentration of the fuel acquired by the acquisition unit is relatively high compared to when the alcohol concentration of the fuel acquired by the acquisition unit is relatively low.

Preferably, the control unit sets the motoring time to be shorter when the running time or the parameter is relatively low compared to when the running time or the parameter is relatively high.

Preferably, the control unit sets the motoring time to be shorter when, the outside temperature is relatively high compared to when the outside temperature is relatively low.

Preferably, the control unit carries out, during the motoring, a resistance reduction control to reduce at least one of an intake resistance, a compression resistance, and an exhaust resistance.

Preferably, the parameter represents an accumulated intake air amount calculated during a period from the low-temperature start to the stoppage of the internal combustion engine.

Preferably, the predetermined value for the parameter is a value higher when the outside temperature is relatively low compared to when the outside temperature is relatively high.

Preferably, the internal combustion engine is mounted in a hybrid vehicle. The internal combustion engine is always connected to the gear mechanism of the hybrid vehicle in a power transmittable manner.

The present invention provides a superior effect according to which the motoring time can be optimally set for an internal combustion engine in which alcohol fuel can be used, after the stoppage thereof.

Further features of the present invention will become apparent from the following description of exemplary embodiments (with reference to the attached drawings).

DESCRIPTION OF THE EMBODIMENTS

The following section will describe an embodiment of the present invention based on the attached drawings.

First Embodiment

Figure 1:
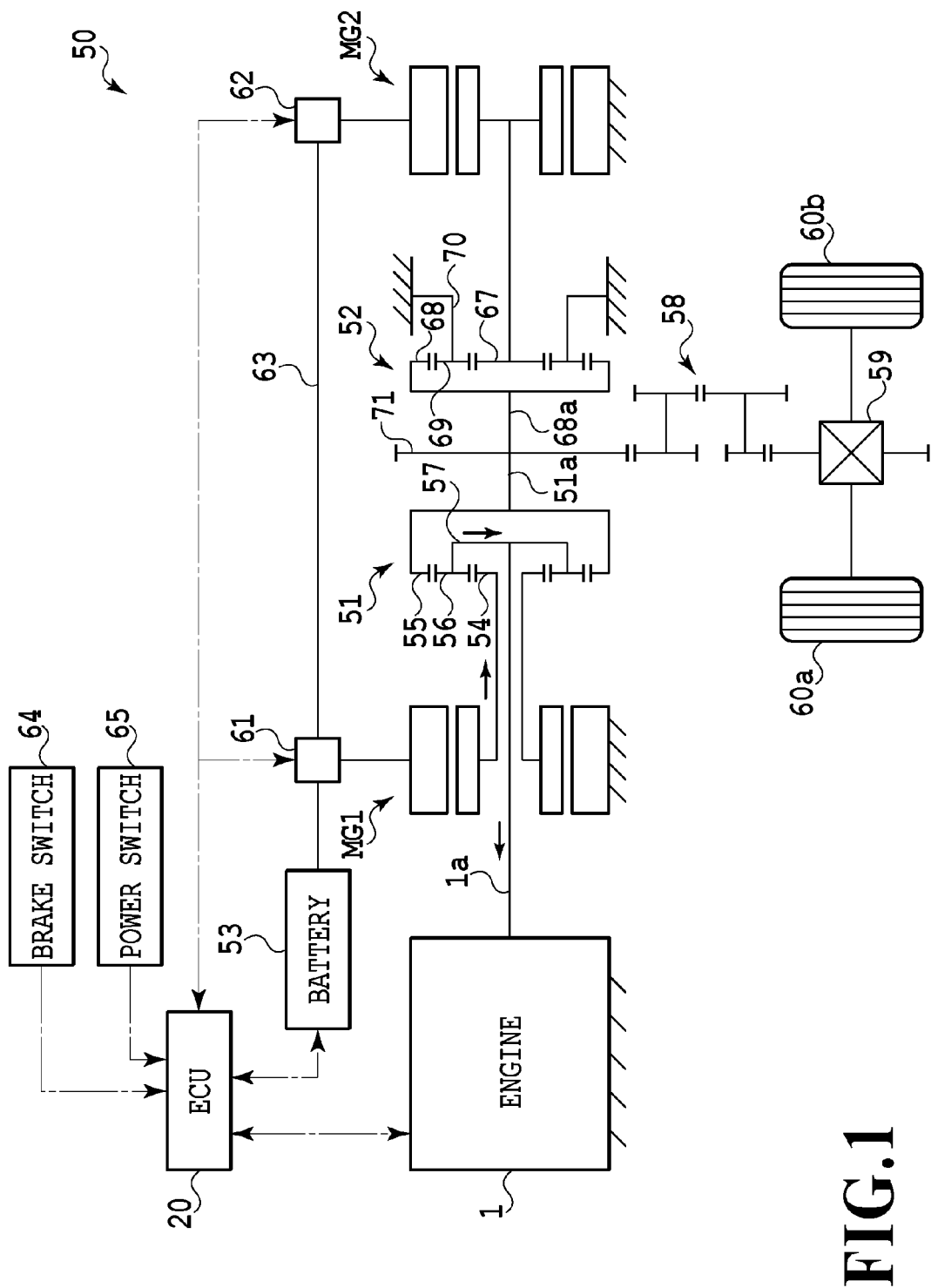
FIG. 1 is a schematic view illustrating a hybrid vehicle according to the first embodiment of the present invention.

FIG. 1 is a schematic view illustrating the configuration of a hybrid vehicle 50 according to the first embodiment. The hybrid vehicle 50 includes: an internal combustion engine (i.e., an engine 1); a triaxial-type power transfer mechanism 51 connected to a crank shaft 1a as the output axis of the engine 1; the first electric motor that can generate power and that is connected to the power transfer mechanism 51 (i.e., the first motor generator) (hereinafter abbreviated as the first motor) MG1; a deceleration gear mechanism 52 coaxially connected to a ring gear shaft 51a functioning as an output axis of the power transfer mechanism 51; the second electric motor that can generate power and that is connected to the deceleration gear mechanism 52 (i.e., the second motor generator (hereinafter abbreviated as the second motor) MG2; and an electronic control unit as a control unit for controlling the entire vehicle (hereinafter referred to as ECU) 20.

The engine 1 constitutes the first power source for running. The second motor MG2 constitutes the second power source for running. Specifically, the hybrid vehicle 50 includes, as for-running power sources, two power sources of the engine 1 and the second motor MG2. The first motor MG1 mainly functions as a power generator to charge a battery 53. However, the first motor MG1 also functions as an electric motor to drive or start the engine 1.

The ECU 20 can be configured to include an engine ECU for controlling the engine, a motor ECU for controlling motors MG1 and MG2, and a battery ECU for controlling the battery 53.

The engine 1 is a bifuel-type internal combustion engine that can use alcohol fuel. Specifically, the engine 1 can use alcohol fuel (e.g., ethanol, ethanol) and hydrocarbon fuel (e.g., gasoline) that are used individually or mixed together. Thus, the hybrid vehicle 50 according to this embodiment is also configured as an FFV. The engine 1 of this embodiment is a spark-ignited internal combustion engine that uses gasoline as reference fuel. This gasoline can be mixed with alcohol fuel at a blend ratio of 0 to 100%.

The power transfer mechanism 51 includes: a sun gear 54 that is configured by a planet gear mechanism and that is provided at the center; a ring gear 55 provided at the outer periphery section; a plurality of pinion gears 56 provided between the sun gear 54 and the ring gear 55; and a carrier 57 that retains these pinion gears 56 such that the rotation and the revolution are possible.

The carrier 57 is connected to the crank shaft 1a of the engine 1. The sun gear 54 is connected to the first motor MG1. The ring gear 55 is connected to the deceleration gear mechanism 52 via the ring gear shaft 51a.

The deceleration gear mechanism 52 is also configured by a planet gear mechanism coaxially provided with the power transfer mechanism 51. The deceleration gear mechanism 52 includes: a sun gear 67 provided at the center; a ring gear 68 provided at the outer periphery section; a plurality of pinion gears 69 provided between the sun gear 67 and the ring gear 68; and a carrier 70 that retains these pinion gears 69 in a manner such that the rotation is possible and the revolution is impossible. The sun gear 67 connected to the second motor MG2. The ring gear shaft 68a of the ring gear 68 is coaxially connected to the ring gear shaft 51a of the power transfer mechanism 51. The ring gear shafts 51a and 68a include a counter drive gear 71.

The counter drive gear 71 is connected to a gear mechanism 58 including a plurality of counter gears. When the engine 1 and the second motor MG2 are used to run a vehicle, power from the engine 1 is transmitted to the ring gear shaft 51a and power from the second motor MG2 is transmitted to the ring gear shaft 68a. These powers are integrated and are sequentially transmitted to the gear mechanism 58 and a differential gear 59 and are finally transmitted to vehicle wheels (i.e., drive wheels 60a and 60b).

As can be understood from the above description, the engine 1 and the first motor MG1 are always connected to the power transfer mechanism 51 in a power transmittable manner. The engine 1 and the first motor MG1 and the second motor MG2 are always connected to the wheel side in a power transmittable manner via a gear mechanism including the power transfer mechanism 51, the deceleration gear mechanism 52, the gear mechanism 58, and a differential gear 59. The engine 1 and the power transfer mechanism 51 (i.e., the gear mechanism) does not have therebetween a clutch for cutting the former and the latter. The power transfer mechanism 51 (i.e., the gear mechanism) also does not include therein a clutch for cutting power.

The first motor MG1 and the second motor MG2 are both configured as a well-known synchronous generating electric motor providing both functions of an electric motor and a power generator. The first motor MG1 and the second motor MG2 exchange power with the battery 53 via the first inverter 61 and the second inverter 62, respectively.

The ECU 20 controls the supply power and power generation in the first motor MG1 and the second motor MG2 via the first inverter 61 and the second inverter 62 and controls the discharge and charge amounts in the battery 53.

The ECU 20 is configured to include a CPU, ROM, RAM, or input/output port (any of which is not shown) for example. The ECU 20 is electrically connected to a power switch 65 to set the above two power sources to an operable state (ON) or a stopped state (OFF) and a brake switch 64 turned ON or OFF depending on the depression of the brake pedal for example. The ECU 20 can be operated in a hybrid mode as a control mode in which the vehicle 50 is driven by both of the engine 1 and the second motor MG2, an engine mode in which the vehicle 50 is driven only by the engine 1, and a motor mode as a control mode in which the vehicle 50 is driven only by the second motor MG2.

Figure 2:
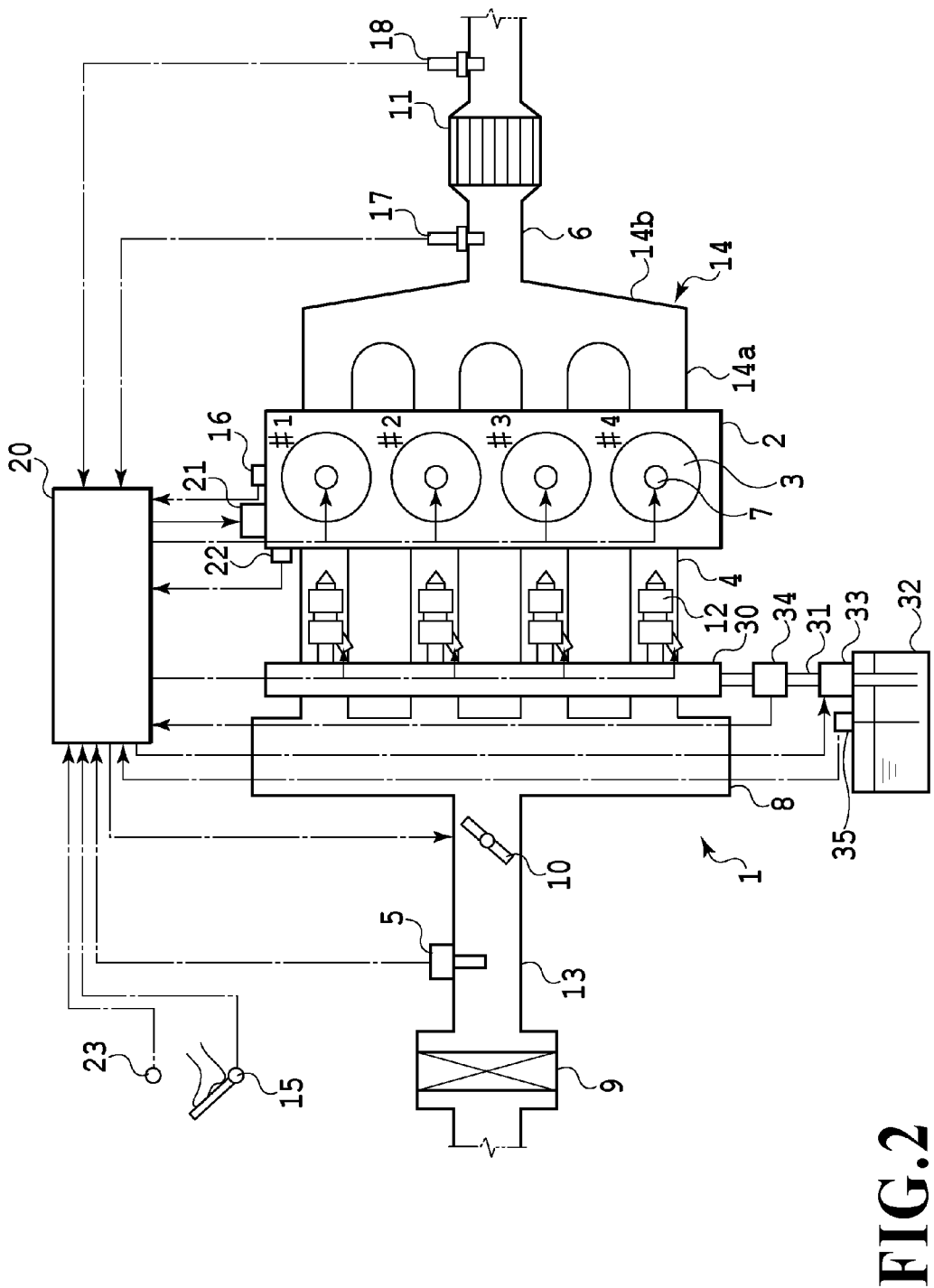
FIG. 2 is a schematic view illustrating a configuration of an internal combustion engine and the control apparatus thereof.

Next, with reference to FIG. 2, the following section will describe the configurations of the engine 1 mounted in the hybrid vehicle 50 and the control apparatus thereof. The engine 1 generates power by combusting the air-fuel mixture in the combustion room 3 formed in the cylinder block 2 to allow a piston to reciprocate within the combustion room 3. The engine 1 of this embodiment is an in-line four-cylinder bifuel-type spark-ignited internal combustion engine including #1 to #4 cylinders. However, the invention is not particularly limited to the number of cylinders of the engine, a cylinder arrangement (e.g., in-line, V-type, or horizontally-opposed), and a firing method for example.

Although not shown, the cylinder head of the engine 1 includes, for each cylinder, an intake valve for opening and closing an intake port and an exhaust valve for opening and closing an exhaust port. Each intake valve and each exhaust valve are driven to open or close by a valve actuation mechanism including a cam shaft. The top of the cylinder head is attached with a spark plug 7 for each cylinder to fire the air-fuel mixture in the combustion room 3.

In particular, a variable valve mechanism is provided in order to change the open valve characteristic of the intake valve. Specifically, the variable valve mechanism consists of a variable valve timing mechanism (hereinafter referred to as VVT) 21. The VVT 21 changes the relative rotation phase of the camshaft to the crank shaft to thereby uniformly change the open/close timings of the intake valve of all cylinders.

Each cylinder has an intake port that is connected to a surge tank 8 functioning as an intake collection room via a branch pipe 4 for each cylinder. The upstream side of the surge tank 8 is connected to the intake pipe 13. The upstream end of the intake pipe 13 has an air cleaner 9. The intake pipe 13 has, in an order from the upstream side, an air flowmeter 5 for detecting the intake air amount and an electronic control-type throttle valve 10. The intake port, the branch pipe, the surge tank 8, and the intake pipe 13 form the intake passage.

An injector (fuel injection valve) 12 is provided for each cylinder to inject fuel into the intake passage (intake port in particular). The fuel injected from the injector 12 is mixed with intake air to form air-fuel mixture. This air-fuel mixture is sucked into the combustion room 3 during the opening of the intake valve, compressed by a piston, and is ignited and fired by the spark plug 7.

On the other hand, each cylinder has an exhaust port connected to an exhaust manifold 14. The exhaust manifold 14 consists of a branch pipe 14a for each cylinder for constituting the upstream section thereof and an exhaust collecting section 14b for constituting the downstream section thereof. The downstream side of the exhaust collecting section 14b is connected to an exhaust pipe 6. The exhaust port, the exhaust manifold 14, and the exhaust pipe 6 form an exhaust passage.

The exhaust pipe 6 is attached with catalyst 11 consisting of three-way catalyst. The upstream side and the downstream side of the catalyst 11 respectively have first and second air-fuel ratio sensors to detect the air-fuel ratio of the exhaust gas (i.e., a pre-catalyst sensor 17 and a post-catalyst sensor 18).

A common delivery pipe 30 for supplying fuel to the injector 12 of the each cylinder is connected to a fuel tank 32 via a fuel piping 31. The fuel piping 31 includes a fuel pump 33 for supplying fuel in the fuel tank 32 to the delivery pipe 30, and an alcohol concentration sensor 34 for detecting the fuel alcohol concentration. The fuel tank 32 includes a remaining fuel amount sensor 35 (e.g., center gauge) for sensing the remaining fuel amount in the fuel tank 32. The alcohol concentration sensor 34 and the remaining fuel amount sensor 35 are connected to the ECU 20.

The alcohol concentration sensor 34 may be the capacitance-type one to detect the alcohol concentration based on the fuel permittivity or the optical one to detect the alcohol concentration based on the refractive index of the light in the fuel for example. In this embodiment, the alcohol concentration sensor 34 is provided in the fuel piping 31. However, the alcohol concentration sensor 34 also can be provided in any section in the fuel path (e.g., the fuel tank 32 or the delivery pipe 30).

Although the alcohol concentration of the fuel is directly detected by the alcohol concentration sensor 34 and the ECU 20, the fuel alcohol concentration also may be estimated by the ECU 20. The estimate method may be arbitrary and a known method also can be used. These detection and estimate will be collectively referred to as acquisition. When the alcohol concentration is detected, the alcohol concentration sensor 34 and the ECU 20 constitute an acquisition unit for acquiring a fuel alcohol concentration. When the alcohol concentration is estimated, the ECU 20 constitutes the acquisition unit.

The configuration of the fuel supply system is not limited to the above example. For example, a fuel tank for gasoline as reference fuel may be separately provided from a fuel tank for alcohol. The fuels in these tanks also may be sent to the delivery pipe 30 and may be mixed in the delivery pipe 30. In this case, the alcohol concentration sensor 34 is preferably provided in the delivery pipe 30.

The above-described spark plug 7, throttle valve 10, injector 12, air flowmeter 5, pre-catalyst sensor 17, and post-catalyst sensor 18 are connected to the ECU 20. The ECU 20 is electrically connected not only to the above-described sensors but also to a crank angle sensor 16 for detecting the crank angle of the engine 1, an accelerator position sensor 15 for detecting the accelerator pedal operation amount (i.e., accelerator position), a water temperature sensor 22 for detecting the cooling water temperature of the engine 1, an outside temperature sensor 23 for detecting the outside temperature, and various other sensors. Based on the detection values for example from various sensors, the ECU 20 controls the spark plug 7, the throttle valve 10, the injector 12, and the VVT 21 for example so that a desired engine output can be obtained to control the ignition timing, the fuel injection amount, the fuel injection timing, the throttle position, or the valve timing of the intake valve for example.

Based on a crank pulse signal from the crank angle sensor 16, the ECU 20 detects the crank angle itself and detects the rotational speed (rpm) of the engine 1. The term "rotational speed" means the revolutions per a unit time and is used synonymously with a number of revolutions.

Based on the signal from the air flowmeter 5, the ECU 20 detects an intake air amount as an intake air amount per unit of time (i.e. intake flow rate). Then, the ECU 20 detects the load on the engine 1 based on at least one of the detected accelerator position, throttle position, and intake air amount.

The ECU 20 generally subjects the throttle position to a feedback control so that the target throttle position determined depending on the accelerator position is identical with an actual throttle position. However, as described later, the ECU 20 subjects, under specific conditions at the start of the engine, the throttle position to a feedback control based on a predetermined program.

The ECU 20 generally subjects the air-fuel ratio (a fuel injection amount in particular) to a feedback control based on the output signals from the pre-catalyst sensor 17 and the post-catalyst sensor 18 so that the air-fuel ratio of the exhaust gas flowed to the catalyst 11 is controlled to be in the vicinity of a stoichiometric ratio.

By the way, as described earlier, in the case of the internal combustion engine, when a low-temperature start is followed by a relatively-short operation (i.e., short trip), the stoppage of the operation is generally followed by the condensation of the water in the exhaust, thus resulting in a relatively-large amount the condensation water or aqueous droplet attached to the inner wall of the exhaust passage. In the case of the bifuel-type internal combustion engine as in this embodiment in particular, alcohol fuel generates a larger amount of water during combustion when compared with hydrocarbon fuel such as gasoline, which causes the above tendency to be remarkable.

The wording "the operation of the internal combustion engine" means a state in which the fuel supply to the internal combustion engine and the ignition are carried out and the fuel combustion drives the crank shaft to rotate to thereby allow the internal combustion engine to generate power. The wording "the stoppage of the internal combustion engine" on the other hand means a state in which the fuel supply to the internal combustion engine and the ignition are stopped and the fuel combustion does not drive the crank shaft to rotate and thus no power is generated from the internal combustion engine. This wording has no relation with whether the crank shaft is rotating or not. The term "motoring" (which will be described later) means a state in which the crank shaft is driven by a power source other than the internal combustion engine in the stopped state of the internal combustion engine.

When aqueous droplets are attached to the inner wall of the exhaust passage as described above, the aqueous droplets may flow down and may be collected and frozen between a relatively-small space between the exhaust valve and the valve sheet. The ice caused by this freezing has a disadvantage in that the ice is continuously attached to at least one of the exhaust valve and the valve sheet even after the subsequent restart of the internal combustion engine, which causes a defective valve closing of the exhaust valve.

Figure 3:
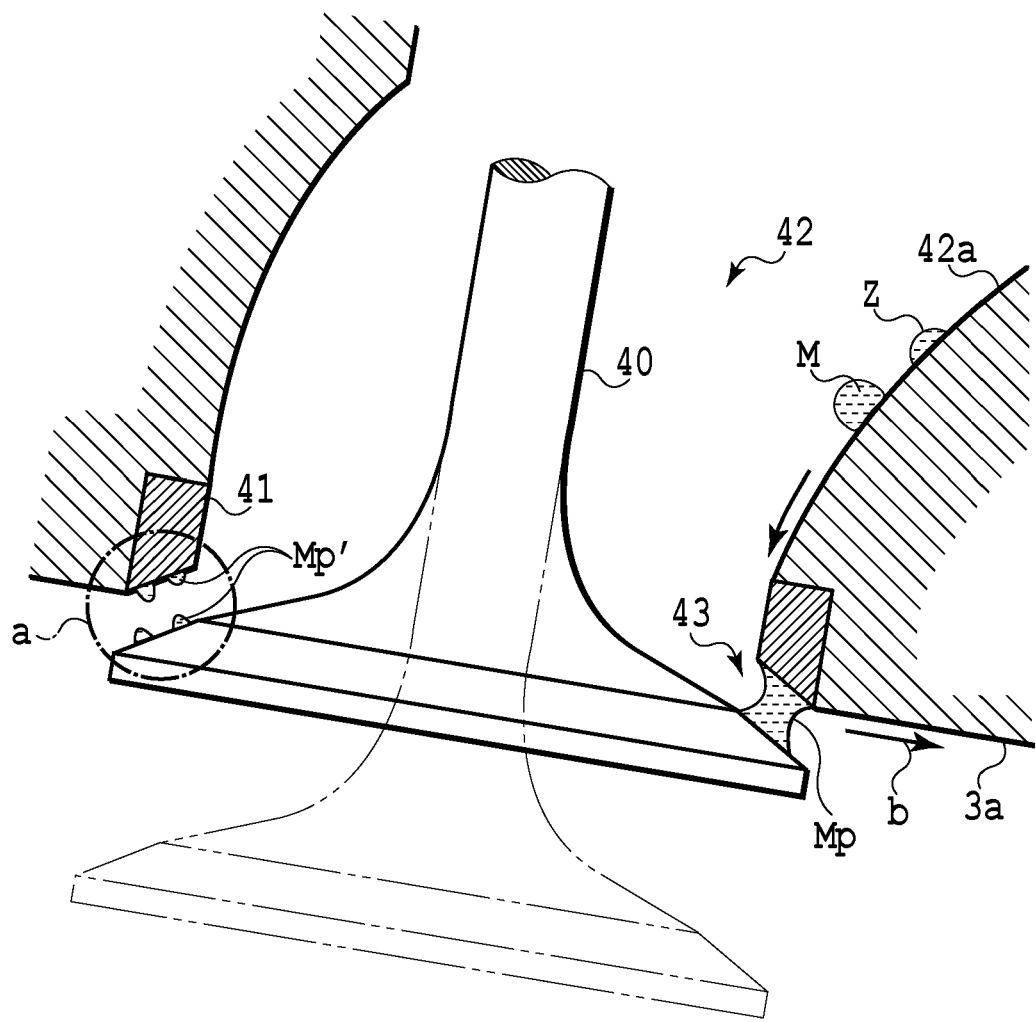
FIG. 3 is a cross-sectional view illustrating the freezing of condensation water.

This point will be described will be described in more detail with reference to FIG. 3. FIG. 3 illustrates an exhaust valve 40, a valve sheet 41, and an exhaust port 42. When the engine is stopped and the rotation of the crank shaft is also stopped, a specific cylinder may be in a state in which the engine is left (or soaked) as shown while the space 43 between the exhaust valve 40 and the valve sheet 41 (i.e., an exhaust valve lift amount) is being small (about 1 to 3 mm). Immediately after the stoppage of the engine, the water vapor of the exhaust gas remaining in the exhaust port 42 causes many aqueous droplets M due to the condensation on the inner wall 42a of the exhaust port 42. The aqueous droplets M are sometimes collected and flow down along the inner wall 42a of the exhaust port and are collected between the space 43 between the exhaust valve 40 and the valve sheet 41. The water is attached, due to the surface tension thereof, to both of the exhaust valve 40 and the valve sheet 41 and forms a water column Mp so as to bridge the former and the latter.

When the engine is stopped within a short period of time after the low-temperature start, the respective members immediately after the stoppage have a temperature exceeding 0 degree C. and thus the above behavior is possible. However, the respective members are soon cooled by the outside air having a temperature equal to or lower than 0 degree C. Thus, the temperatures of the respective members decline relatively rapidly to a temperature equal to or lower than 0 degree C. Then, the water column Mp is frozen and is strongly attached to both of the exhaust valve 40 and the valve sheet 41.

When the engine is subsequently restarted, the exhaust valve 40 is depressed downwardly during the opening of the exhaust valve 40. Thus, the frozen water column Mp is cut in a forced and mechanical manner. However, a chip Mp' of the water column Mp may be still attached to at least one of the exhaust valve 40 and the valve sheet 41 (see the part a). In this case, this chip Mp' is sandwiched between the exhaust valve 40 and the valve sheet 41 during the closing of the exhaust valve 40, thus causing a defective valve closing to prevent the exhaust valve 40 from being completely closed. This defective valve closing is not eliminated until the chip Mp' is melted due to the heat to the exhaust gas for example or until the chip Mp' is broken due to the repeated opening and closing of the exhaust valve 40.

When the defective valve closing of the exhaust valve 40 occurs, a cylinder having the defective valve closing may have compression leakage of the air-fuel mixture, resulting in misfire. In such a case, misfire occurs continuously or intermittently only in those cylinders among all cylinders that have the defective valve closing. Thus, the crank shaft has a rotation fluctuation that is transmitted to the power transfer mechanism 51 and the deceleration gear mechanism 52 for example, resulting in rattling noise and vibration.

In the case of the hybrid vehicle 50 as in this embodiment in particular, the engine 1 is always connected to the power transfer mechanism 51 of the hybrid vehicle 50 in a power transmittable manner. Thus, no clutch exists that cuts power from the engine 1. This necessarily causes the rotation fluctuation of the crank shaft to be undesirably transmitted to the power transfer mechanism 51 and thus each gear such as the deceleration gear mechanism 52. Thus, one gear teeth repeatedly collides with the other gear teeth adjacent thereto in a positive rotation direction and an opposite rotation direction, thereby causing rattling noise and vibration. The engine 1 is also always connected to the wheel side in a power transmittable manner via a gear mechanism. This necessarily causes the rotation fluctuation of the crank shaft to be undesirably also transmitted to the drive wheels 60a and 60b. This may cause another defect of the vibration of the entire vehicle during the stoppage of the vehicle in particular.

One conceivable solution to this disadvantage is, as disclosed in Japanese Patent Laid-Open No. 2009-47071, that the motoring of the engine is carried out after the stoppage of the engine to remove aqueous droplets attached to the inner wall of the exhaust passage by scavenging.

However, since the motoring requires power consumption, the motoring time of the motoring must be optimally set to a minimum required time.

With regard to this, Japanese Patent Laid-Open No. 2009-47071 discloses that, from a viewpoint that an increase of the fuel alcohol concentration causes an increase of the residual moisture in the exhaust pipe, the motoring time is set to be longer in accordance with an increase of the fuel alcohol concentration.

However, this technique disclosed in Japanese Patent Laid-Open No. 2009-47071 does not intend to solve the disadvantage unique to the invention of this application as described above (i.e., the freezing caused when the operation for a short time is carried out after the low-temperature start of the engine and the resultant defective valve closing of the exhaust valve after the restart). Thus, the motoring time after the stoppage of the engine cannot be optimally set even with the application of the technique disclosed in Japanese Patent Laid-Open No. 2009-47071.

On the other hand, the present inventor has reached, through keen research, a new finding different from that disclosed in Japanese Patent Laid-Open No. 2009-47071. This new finding is that an increase of the fuel alcohol concentration causes a decrease of an amount of droplets finally attached to the inner wall of the exhaust passage.

This point will be described with reference to FIG. 3. When mixed fuel of gasoline and alcohol is used to perform the low-temperature start of the engine and the engine is subsequently operated for a short time and stopped, the stoppage is immediately followed by the attachment of not only the aqueous droplets M but also alcohol itself or many alcohol droplets Z of alcohol aqueous solution to the inner wall 42a of the exhaust port. These aqueous droplets M and alcohol droplets Z will be collectively referred to as droplets. The alcohol droplet Z has a lower surface tension than that of the aqueous droplet M and has a shape flatter than that of the aqueous droplet M as shown in the drawing. Furthermore, methanol or ethanol, which is generally used as alcohol fuel, has a small number of C in the composition formula and thus has high hydrophilicity and is easily mixed with water and turns into alcohol aqueous solution.

Figure 4:
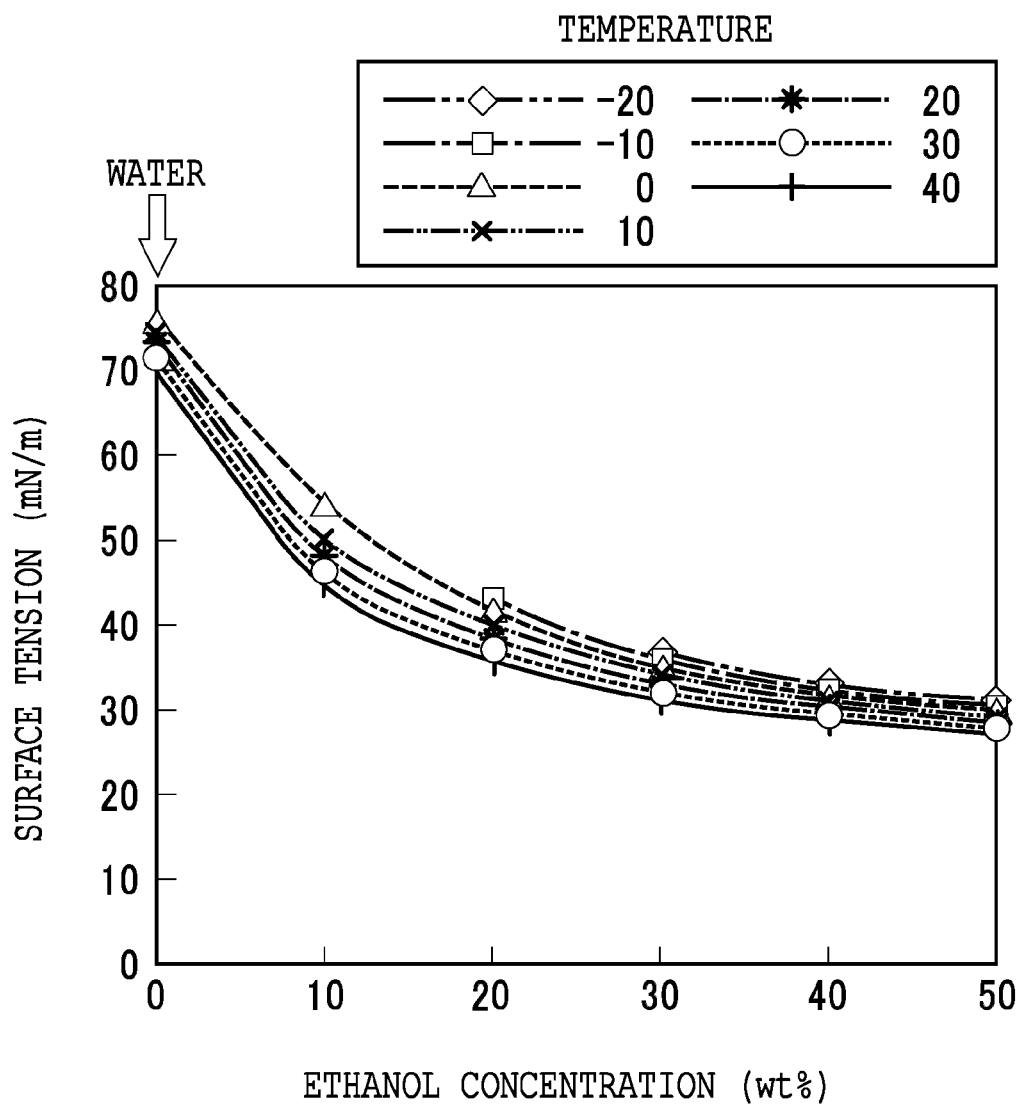
FIG. 4 is a graph illustrating the surface tension characteristic of ethanol aqueous solution.

The surface tension of the alcohol aqueous solution tends to be lower with an increase of the alcohol concentration. FIG. 4 illustrates the surface tension characteristic of the ethanol aqueous solution as one example. As shown, an increase of the ethanol concentration causes a decrease of the surface tension. The 0% of ethanol concentration means a case of water only.

Figure 5:
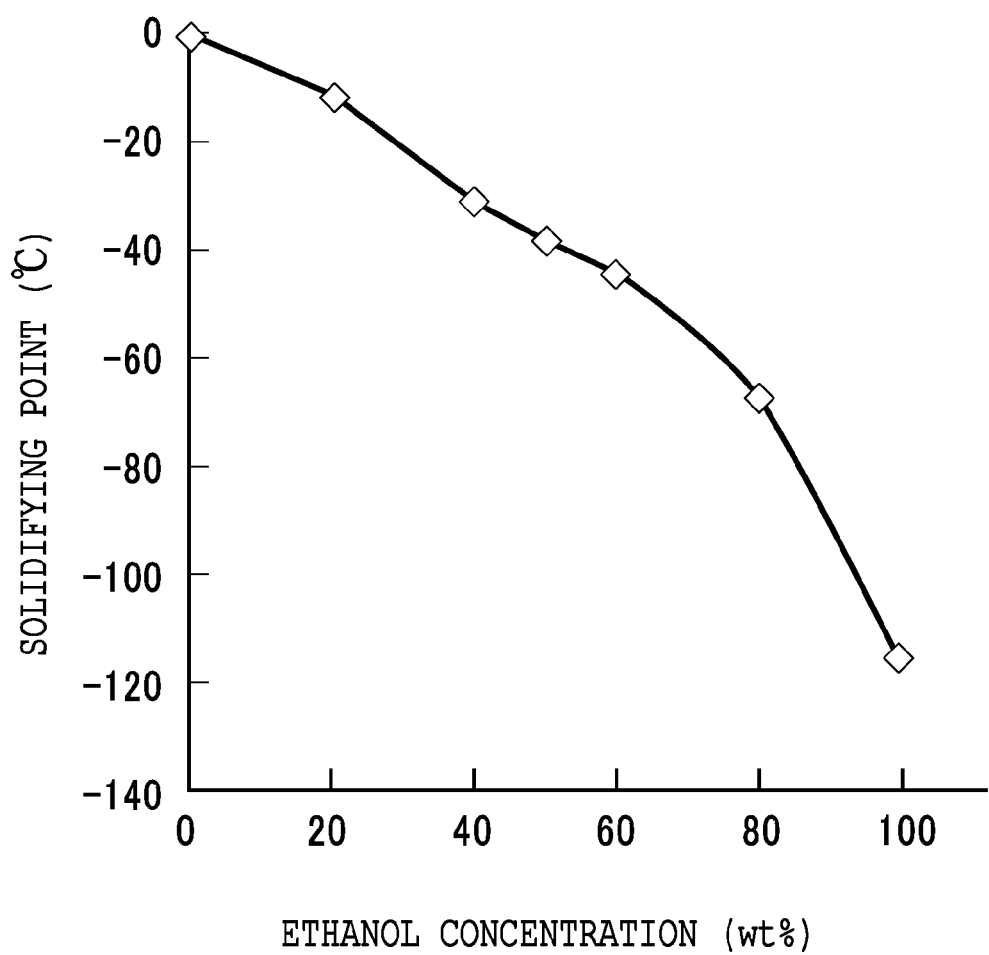
FIG. 5 is a graph illustrating the solidifying point characteristic of the ethanol aqueous solution.

The solidifying point of the alcohol aqueous solution tends to be lower with an increase of the alcohol concentration. FIG. 5 illustrates the solidifying point characteristic of the ethanol aqueous solution as one example. As shown, an increase of the ethanol concentration causes a depression of the solidifying point. The 100% of ethanol concentration means a case of ethanol only.

As shown in FIG. 3, the alcohol droplet Z has a lower surface tension than that of the aqueous droplet M and thus easily flows along the inner wall 42a of the exhaust port. Furthermore, the alcohol droplet Z is generally merged with the aqueous droplet M during the process of flowing along the inner wall 42a of the exhaust port and flows down in the form of the alcohol aqueous solution while being mixed with the aqueous droplet M. The alcohol droplet Z also may flow down individually. However, the alcohol droplet Z in this case also may be collectively referred to as a "merged alcohol droplet Z". Since the merged alcohol droplet Z has a surface tension lower than that of the aqueous droplet M, the merged alcohol droplet Z tends to flow down in a higher amount from the inner wall 42a of the exhaust port and thus the merged alcohol droplet Z flows down more smoothly while retaining a flatter shape. Thus, even when the merged alcohol droplet Z enters the space 43 between the exhaust valve 40 and the valve sheet 41, the merged alcohol droplet Z is attached, with a lower probability, to both of the exhaust valve 40 and the valve sheet 41 to form a liquid column such as the water column Mp. Rather, the merged alcohol droplet Z passes the space 42 and flows along the upper face 3a of the combustion room (see the arrow b). Alternatively, the merged alcohol droplet Z once attached to the exhaust valve 40 and the valve sheet 41 in the space subsequently expands, without forming a liquid column, along the surface of the exhaust valve 40 and the valve sheet 41 and the upper face 3a of the combustion room.

An increase of the fuel alcohol concentration causes the entire droplet attached to the inner wall 42a of the exhaust port to have a higher alcohol concentration. Thus, the surface tension declines and the above tendency are more remarkable. Thus, the amount of the droplets finally attached to the inner wall 42a of the exhaust port is reduced and a liquid column is suppressed from occurring.

From the viewpoint of the solidifying point, even when a liquid column occurs, a probability that the liquid column is frozen until the next engine restarting is carried out is lower with an increase of the fuel alcohol concentration. The reason is that an increase of the fuel alcohol concentration causes an increase of the alcohol concentration of the liquid column and thus a depression of the solidifying point of the liquid column.

Due to these reasons, an increase of the fuel alcohol concentration causes a lower probability that a frozen liquid column is formed until the next engine restarting is carried out and also causes a lower probability that a defective valve closing of the exhaust valve occurs. Thus, it is considered that the motoring time for removing the aqueous droplet M and the alcohol droplet Z by scavenging can be also reduced.

Thus, according to this embodiment, in contrast with the technique disclosed in Japanese Patent Laid-Open No. 2009-47071, the motoring time is reduced when the alcohol concentration of the fuel is relatively high compared to when the alcohol concentration of the fuel is relatively low. This allows the motoring time to be optimally set to a minimum required time, thus minimizing the power consumption due to motoring.

In this specification, when a relation between two parameters X and Y are represented as "when X is relatively high, Y is small compared to when X is relatively low" or similar representation means the following. Specifically, when two different Xs (i.e., X1 and X2 (X1<X2)) are assumed, X2 is relatively higher than X1 and X1 is relatively lower than X2. The wording "X is relatively high" means X=X2 and the wording "X is relatively low" means X=X1. When Y1 and Y2 corresponding to X1 and X2 have a relation of Y1>Y2 or when a combination of (X1, Y1) and (X2, Y2) having such a relation can be extracted, then it is represented as "when X is relatively high, Y is small compared to when X is relatively low".

Figure 6:
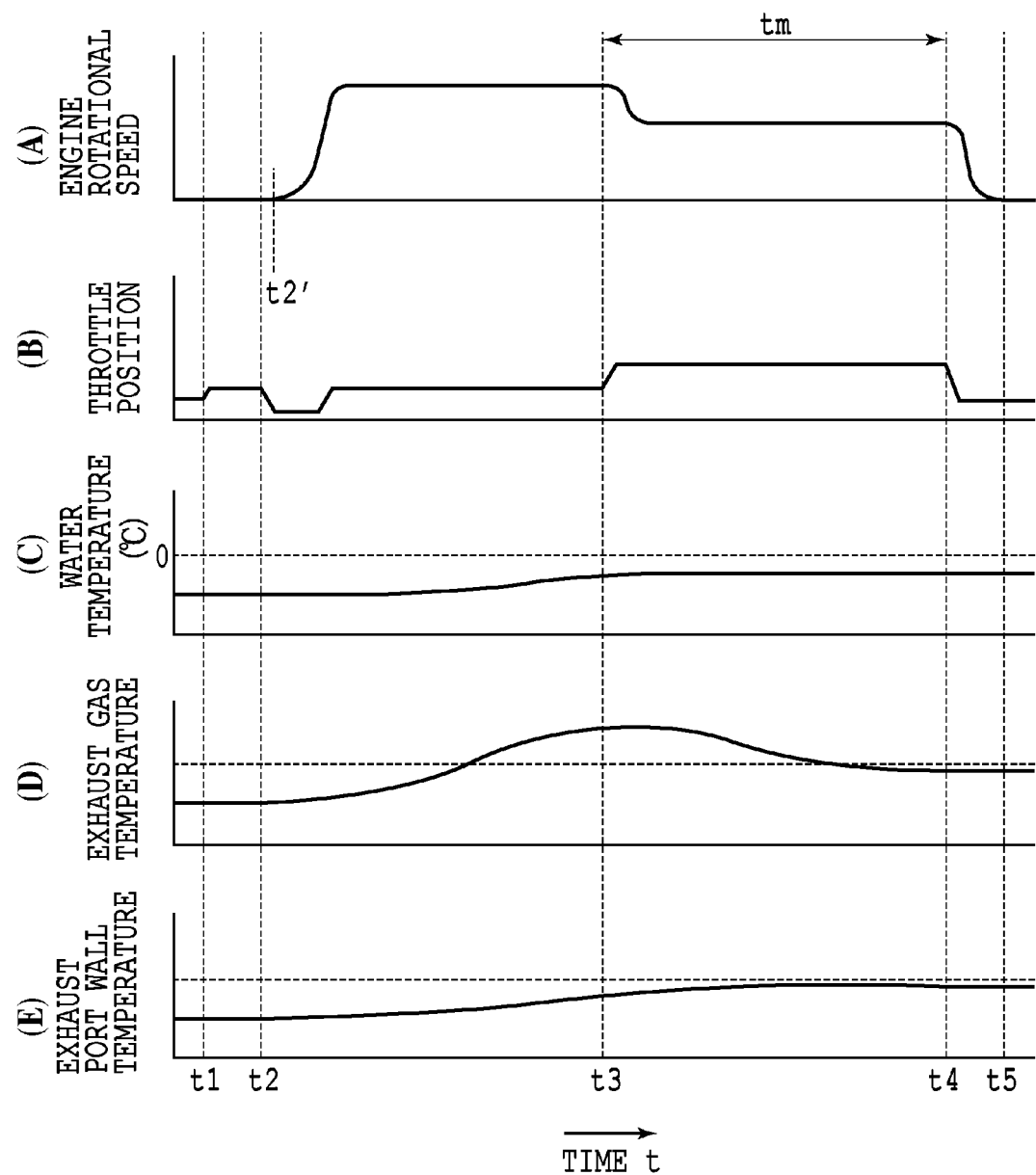
FIG. 6 is a time chart illustrating the summary of the control of the first embodiment.

The following section will describe the summary of the control of this embodiment with reference to the example shown in FIG. 6. This control is mainly carried out by the ECU 20.

FIG. 6 shows the temporal developments of: (A) the engine rotational speed, (B) the position of the throttle valve (throttle position), (C) the water temperature of the cooling water, (D) the exhaust gas temperature in the exhaust port, and (E) the temperature of the inner wall of the exhaust port (exhaust port wall temperature). First, at the time t1, a user turns ON the power switch 65. Then, a system ON signal for activating the entire apparatus is generated and received by the ECU 20 to thereby activate the entire apparatus. Then, the ECU 20 provides a control, although the control is arbitrary, to set an actual throttle position to a target throttle position depending on the outside temperature (detected outside temperature) detected by the outside temperature sensor 23 (see (B)). This is to approximately match the actual throttle position to the target throttle position suitable for the subsequent first idle rotational speed.

Next, at the time t2, the power switch 65 is turned ON while a brake pedal is being depressed by the user. Then, the brake switch is ON and the power switch is ON. Thus, an engine start request signal is generated and received by the ECU 20 to thereby start the engine 1. In an actual case, although this is arbitrary, the generation of the engine start request signal is simultaneously performed with the turning ON of heaters included in the pre-catalyst sensor 17 and the post-catalyst sensor 18. Then, at the time t2' after a few seconds (1 to 2 seconds), the engine is started. This is due to a requirement for emission. However, the time t2 and the time t2' may be considered as identical in a practical case.

Here, a case is shown in which the engine is started at the outside temperature is lower than the ice point which is 0° C. (i.e. a case of a low-temperature start). The water temperature and the exhaust port wall temperature are also substantially equal to the outside temperature (see (C) and (E)). Thus, the engine is started in order to rapidly heat the engine and the catalyst.

Figure 7:
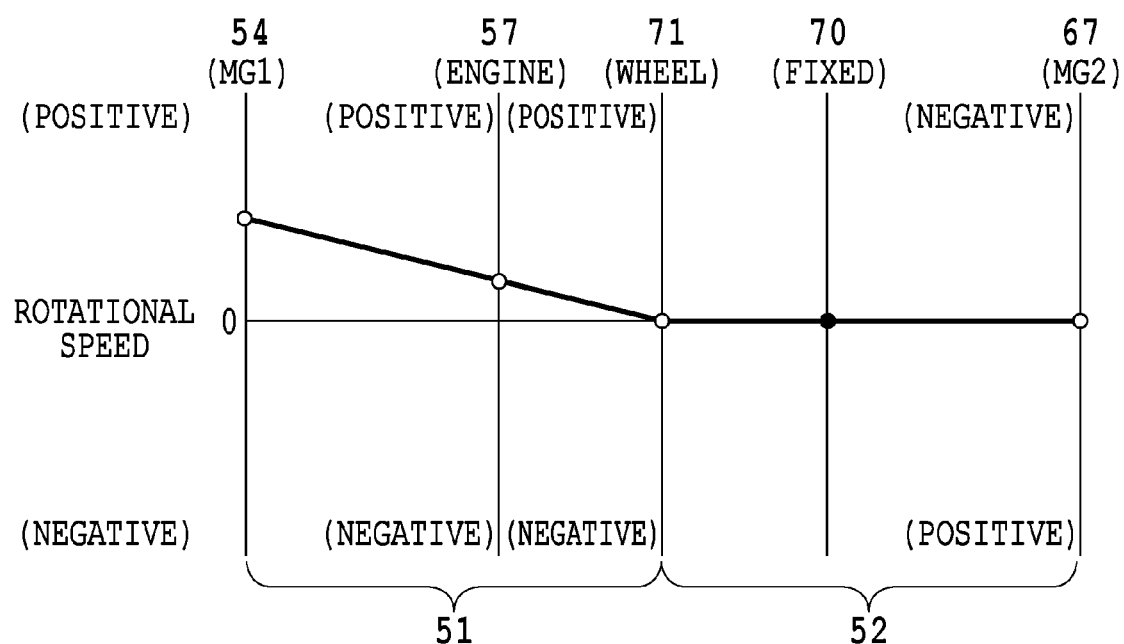
FIG. 7 illustrates a velocity diagram at the start of the internal combustion engine.

As shown in FIG. 1, during the engine start, the first motor MG1 is turned ON and the crank shaft 1a of the engine 1 is driven to rotate or cranked by the first motor MG1 via the power transfer mechanism 51. The flow of the driving force is shown by an arrow in FIG. 1 and the velocity diagram is shown in FIG. 7. During this, the fuel injection and the ignition are also carried out.

As shown in FIG. 6(B), during the cranking, a control is provided to set the throttle position to a predetermined position further lower than a throttle position corresponding to the reference target idle rotational speed (e.g., 1000 rpm) after the engine warming. This is to minimize the intake air amount to reduce the vibration.

After the engine start, the engine is subjected to a first idle operation in the shown example. Specifically, the throttle position or the engine rotational speed is controlled so that the actual engine rotational speed is equal to a target first idle rotational speed depending on the water temperature detected by the water temperature sensor 22 (detected water temperature). The target first idle rotational speed is of course higher than the reference target idle rotational speed.

During the operation of the engine, the exhaust gas temperature gradually increases (see (D)) and this temperature increase causes a gradual increase of the exhaust port wall temperature (see (E)). In particular, the exhaust port wall temperature increases from a temperature lower than 0° C. before the engine start. However, the exhaust port wall temperature increases at a speed slower than the speed at which the exhaust gas temperature increases.

During the operation of the engine, the ECU 20 sequentially accumulates the intake air amount (detected intake air amount) detected by an airflow meter 5 at a predetermined calculated cycle (about a few msec.). This is to substantially measure the engine running time. This point will be detailed later.

Next, at the time t3, the user turns OFF the power switch 65. Then, an engine stop request signal is generated and received by the ECU 20 to thereby stop the engine 1. Specifically, the ECU 20 stops the fuel injection and the ignition at this timing.

At the time t3, the ECU 20 determines whether or not the outside temperature detected by the outside temperature sensor 23 (detected outside temperature) Ta is equal to or lower than the predetermined temperature α. The ECU 20 also determines whether or not an accumulated intake air amount ΣGa representing an accumulated value of the detected intake air amounts at the present time is equal to or lower than a predetermined value (i.e., a predetermined threshold value β). The predetermined temperature α for the outside temperature Ta preferably represent the maximum value of the temperature at which an amount of attached droplets due to condensation after the engine stop is relatively high (e.g., 5° C.) and more preferably represents the maximum value of the temperature at which droplets or thus a liquid column occur(s) after the engine stop with a high possibility (e.g., 0° C.). When the detected outside temperature Ta is equal to or lower than the predetermined temperature α and the accumulated intake air amount ΣGa is equal to or lower than the threshold value β, then the ECU 20 determines that the engine after the low-temperature start was operated for a very short time of a predetermined value or less (i.e., determines that a short trip after the low-temperature start was carried out) and thus carries out the motoring after the engine stop or the motoring control.

Specifically, in this case, a risk as described above may be caused in which the vehicle left as it is causes the condensation liquid generated in the exhaust passage to be frozen to thereby cause the defective valve closing of the exhaust valve. Thus, in order to suppress this, the motoring is carried out immediately after the engine stop to scavenge or ventilate the interior of the exhaust passage to remove the water in the exhaust passage in advance. This motoring control also can be called a scavenging control or a ventilation control.

A predetermined value for the engine running time functioning as a reference value to determine whether the motoring is carried out or not corresponds to the maximum value of time at which condensation liquid enough to cause the defective valve closing of the exhaust valve is attached to the inner wall of the exhaust port immediately after the engine stop. The maximum value as described above may change depending on various parameters (e.g., the engine operation state during the operation before the engine stop, the outside temperature, the exhaust gas temperature, the exhaust port wall temperature, the moisture in the exhaust port).

Whether the engine running time is equal to or lower than the predetermined value or not can be simply determined based on whether or not the engine running time (time from t2' to t3) based on a time unit is equal to or lower than a predetermined threshold value (e.g., a predetermined value of 120 seconds or less). However, a load size changes during the engine operation and this change causes a change in how the exhaust gas temperature and the exhaust port wall temperature increase. Thus, simple comparison based on a time unit is insufficient to consider such a load change. Thus, in this embodiment, the accumulated value of the intake air amount changing depending on the size of the engine load (i.e., accumulated intake air amount ΣGa) is used and is compared with the threshold value β to indirectly determine whether the engine running time is equal to or lower than the predetermined value or not. This consequently provides the consideration of the load change during the engine operation to optimally determine whether the motoring is carried out or not.

The accumulated intake air amount ΣGa changes depending not only on the size of the engine load during the engine operation but also on the length of the engine running time. The reason is that an increase of the engine running time causes an increase of the accumulated time, thus resulting in an increase of the accumulated intake air amount ΣGa. Thus, the accumulated intake air amount ΣGa is a parameter that increases in accordance with an increase of the engine running time. In this embodiment, whether the motoring is carried out or not is determined based on such a parameter. The parameter also may include an accumulated fuel injection amount or an accumulated in-cylinder pressure for example.

As shown in FIG. 6(A), immediately after the engine is stopped at the time t3, the motoring is continuously carried out. During this, as in the engine start, the first motor MG1 is turned ON and the crank shaft 1a of the engine 1 is driven-rotated or cranked by the first motor MG1 via the power transfer mechanism 51. During this, no fuel injection or ignition is carried out. This is advantageous for the reduction of power consumption because the motoring is carried out so that a high engine rotational speed is reduced to a low rotational speed.

In order to minimize the power consumption in the first motor MG1, the engine rotational speed during the motoring is preferably minimized. In this embodiment, the target engine rotational speed during the motoring is set to be lower than the target first idle rotational speed during the previous first idle operation. Thus, during the motoring, the engine is driven-rotated at a rotational speed lower than the first idle rotational speed (see (A)). However, the target engine rotational speed during the motoring can be determined arbitrarily and can be set to be lower than the reference target idle rotational speed for example.

At the time t3 or immediately after the time t3, the motoring execution time (i.e. motoring time tm) is calculated or set based on the alcohol concentration detected by the alcohol concentration sensor 34 (detected alcohol concentration). The calculated motoring time tm is a time that is, as described above, short when the alcohol concentration is relatively high compared to when the alcohol concentration is relatively low.

During the motoring, a resistance reduction control is also carried out to reduce at least one of an intake resistance, a compression resistance, and an exhaust resistance. As a result, the load to the first motor MG1 can be reduced to reduce power consumption. In the shown example, the throttle position is increased in order to reduce the intake resistance (see (B)). In particular, the throttle position is increased by a predetermined amount with regard to the throttle position at the engine stop t3. This can consequently reduce the intake resistance and can increase a newly-introduced amount, thus promoting scavenging or ventilation.

Figure 8:
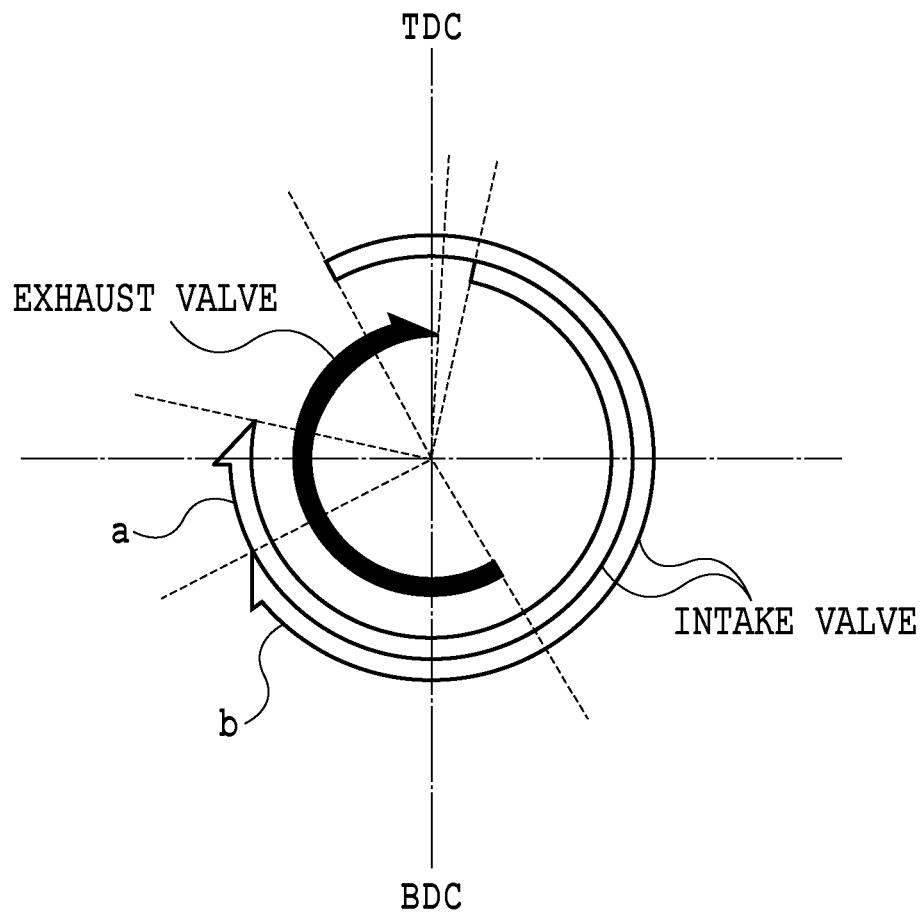
FIG. 8 illustrates the valve timing of the intake valve with regard to the resistance reduction control.

Another control as another resistance reduction control is also carried out to reduce the compression resistance by reducing the actual compression ratio (also referred to as a dynamic compression ratio or an effective compression ratio for example). This is realized by changing the valve timing of the intake valve through the intake side VVT 21. As shown in FIG. 8, the intake side VVT 21 can be used to change the valve timing of the intake valve between the maximum delay angle timing a and the maximum advance angle timing b. During the execution of the resistance reduction control, the intake side VVT 21 is operated so that the valve timing of the intake valve is set to the maximum delay angle timing a. As a result, the intake valve is closed at the maximally-delayed timing after the bottom dead center BDC, thus minimizing the actual compression ratio and minimizing the compression resistance.

When the motoring time tm calculated as described above has passed since the time t3 and the time t4 is reached, then the motoring is stopped or completed and the first motor MG1 is turned OFF. As a result, the engine rotational speed gradually decreases to reach zero (see (A)). At the time t4, the resistance reduction control is also stopped or completed and the throttle position is returned to a predetermined position (see (B)) and the intake side VVT 21 is also returned to a predetermined position.

At the time t5 at which the engine rotational speed is zero, a system off signal for stopping the entire apparatus is generated and received by the ECU 20, thereby stopping the entire apparatus.

Figure 9:
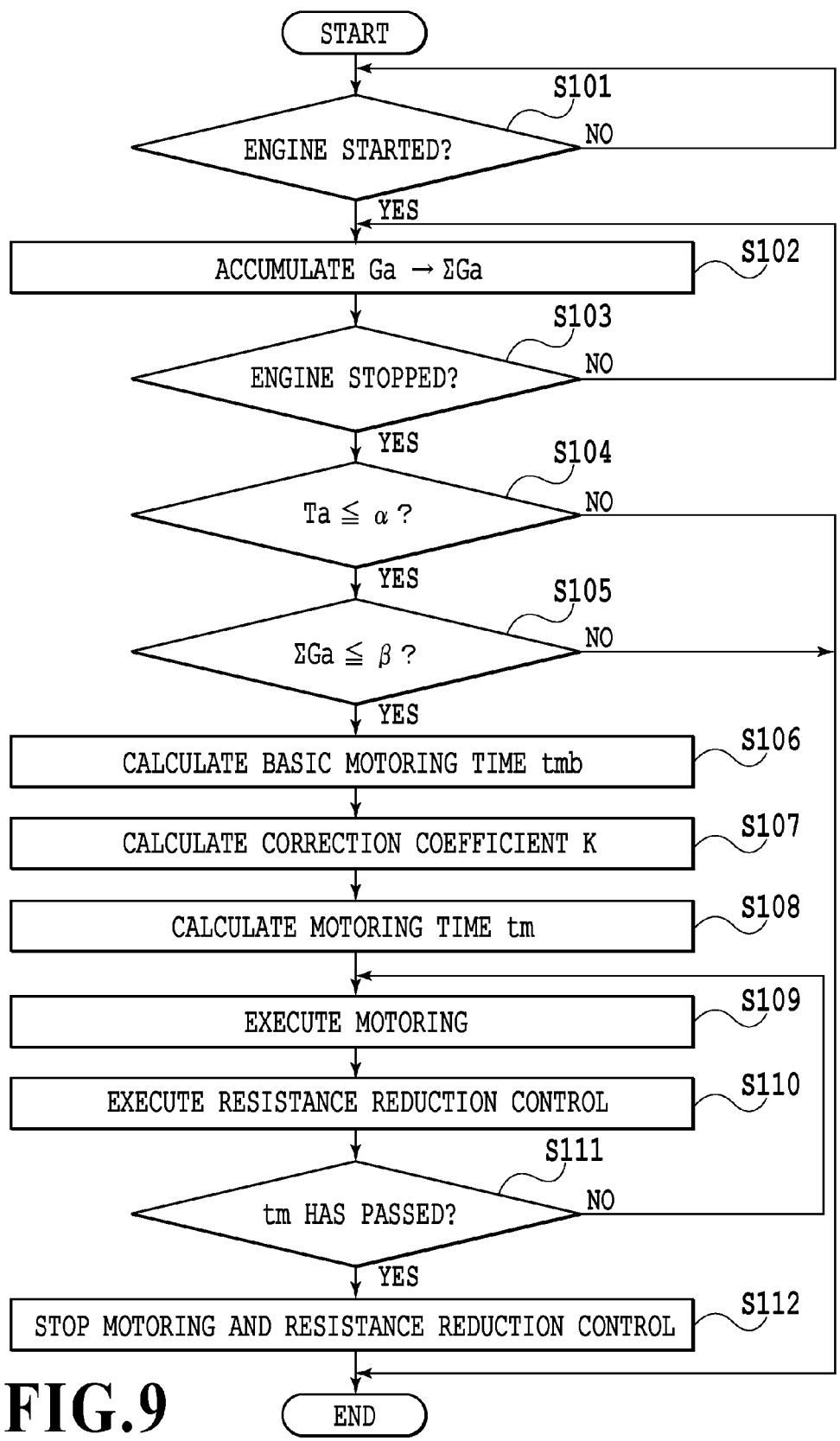
FIG. 9 is a flowchart illustrating the main part of the control of the first embodiment.

Next, an example of a control for the main part of the above control will be described with reference to the flowchart of FIG. 9.

First, at Step S101, whether the engine 1 is started or not is determined. Specifically, the brake switch 64 is turned ON during the engine stopped state and the power switch 65 is turned ON. Whether an engine start request signal is generated or not is determined. As described earlier, during the generation of the engine start request signal, the first motor MG1 is turned ON and the engine is started. If the engine is not started, a standby state is started. If the engine is started, the processing proceeds to Step S102.

In Step S102, the value of the detected intake air amount Ga at this calculation timing or at the present time is accumulated to thereby calculate the accumulated intake air amount ΣGa.

In Step S103, whether the engine 1 is stopped or not (specifically, whether the power switch 65 is turned OFF or not) is determined. If the engine 1 is not stopped, the processing returns to Step S102 and the calculation of the accumulated intake air amount ΣGa is sequentially repeated. If the engine 1 is stopped, the processing proceeds to Step S104.

In Step S104, whether or not the detected outside temperature Ta at the engine stop is equal to or lower than the above-described predetermined temperature α is determined. If determination results in "yes", then the previously-executed engine start is determined as a low-temperature start and the processing proceeds to Step S105. Specifically, since a case of a short trip in which the engine is stopped after a short time after the engine start is assumed, when the outside temperature at the engine stop is equal to or lower than the predetermined temperature α, the outside temperature at the engine start is also assumed to be equal to or lower than the predetermined temperature α and the low-temperature start is determined. If determination results in "no" on the other hand, the processing is completed.

In Step S105, whether or not the accumulated intake air amount ΣGa at the engine stop is equal to or lower than the predetermined threshold value β is determined. If determination results in "yes", the engine running time from a low-temperature start to the stoppage is substantially determined to be equal to or lower than the predetermined value and the processing proceeds to Step S106. This case applies to a case where the operation for a very short time is carried out after the low-temperature start. Thus, there is a possibility of the defective valve closing of the exhaust valve due to the freezing of the condensation liquid as described above. If determination results in "no" on the other hand, the processing is completed.

Figure 10:
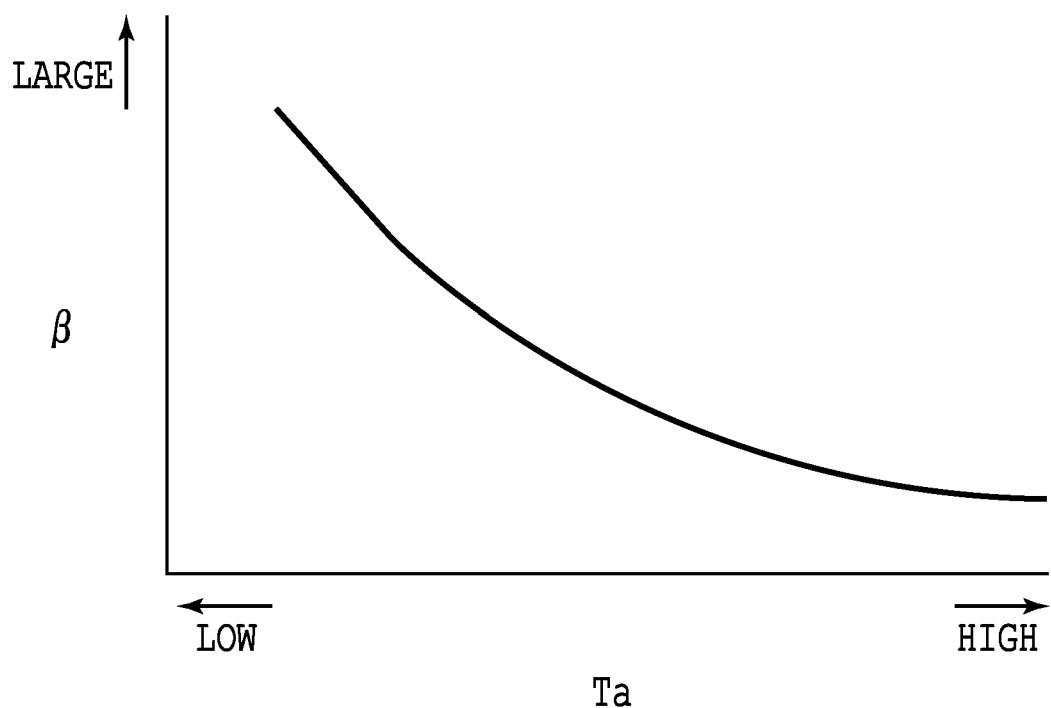
FIG. 10 illustrates a map for calculating the threshold value of the accumulated intake air amount.

The threshold value β is calculated based on a map as shown in FIG. 10 (which may be a function and this applies to the following section) based on the detected outside temperature Ta at the engine stop. According to this, the threshold value β is set to be high when the outside temperature Ta is relatively low compared to when the outside temperature Ta is relatively high. In particular, the threshold value β is set to be high in accordance with the decrease of the outside temperature Ta. The reason is that, when the outside temperature Ta is relatively low, then the exhaust port wall temperature at the engine start has a lower initial value compared to when the outside temperature Ta is relatively high and thus a higher amount of condensation water is generated and thus a higher thermal energy is required to increase the exhaust port wall temperature to a temperature at which the condensation water can be suppressed. By setting the threshold value β as described above, the threshold value β can be optimally set depending on the actual occurrence situation of the condensation water.

The threshold value β for example is set to a value of the accumulated intake air amount ΣGa corresponding to the first idle running time of about 100 seconds when the outside temperature Ta is −10° C.

Figure 11:
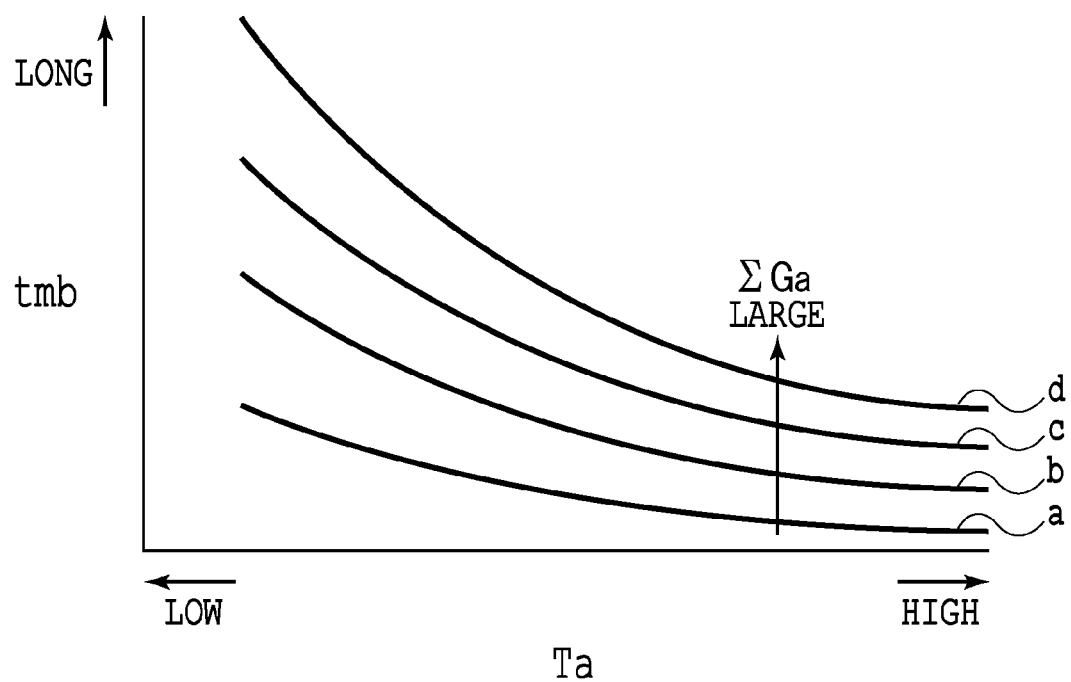
FIG. 11 illustrates a map for calculating the basic motoring time.

In Step S106, the basic motoring time tmb for the motoring is calculated based on a map as shown in FIG. 11 based on the detected outside temperature Ta at the engine stop and the accumulated intake air amount ΣGa. According to this, the basic motoring time tmb is calculated to have a value to be lower when the outside temperature Ta is relatively high compared to when the outside temperature Ta is relatively low. In particular, the basic motoring time tmb is calculated to be shorter in accordance with an increase of the outside temperature Ta. The reason is that, when the outside temperature Ta is relatively high, a smaller amount of condensation water is generated compared to when the outside temperature Ta is relatively is low. The basic motoring time tmb is calculated to be shorter when the accumulated intake air amount ΣGa is relatively small compared to when the accumulated intake air amount ΣGa is relatively high. In particular, the basic motoring time tmb is calculated to be shorter in accordance with the decrease of the accumulated intake air amount ΣGa. The reason is that the amount of generated condensation water is smaller when the accumulated intake air amount ΣGa is relatively small compared to when the accumulated intake air amount ΣGa is relatively large. By setting the basic motoring time tmb as described above, the final motoring time tm (which is calculated Step S108 (which will be described later)) can be optimally set depending on the actual situation of the generation of the condensation water.

As is clear from this description, the final motoring time tm is set to be shorter when the engine running time after the low-temperature start is relatively short compared to when the engine running time after the low-temperature start is relatively long. The final motoring time tm is set to be shorter when the outside temperature is relatively high compared to when the outside temperature is relatively low. In particular, the final motoring time tm is set to be shorter as the engine running time after the low-temperature start is shorter and the outside temperature is higher. In FIG. 11, the lines a, b, c, and d represent the characteristics at the accumulated intake air amount ΣGa corresponding to the first idle operations at 10 seconds, 30 seconds, 60 seconds, and 90 seconds, respectively. These times are merely illustrative and characteristics at a longer time also can be set as required.

In Step S107, a correction amount is calculated to correct the basic motoring time tmb depending on the fuel alcohol concentration. Specifically, the correction coefficient K to be multiplied with the basic motoring time tmb is calculated from any of the maps as shown in FIGS. 12A, 12B, and 12C for example based on the detected alcohol concentration AL.

Next, in Step S108, the final motoring time tm is calculated by multiplying the basic motoring time tmb with the correction coefficient K (tm=K×tmb). The basic motoring time tmb was corrected by multiplying the basic motoring time tmb with the correction coefficient K. However, any correction method may be used and correction by addition, subtraction, or division for example also can be performed.

Figure 12A:
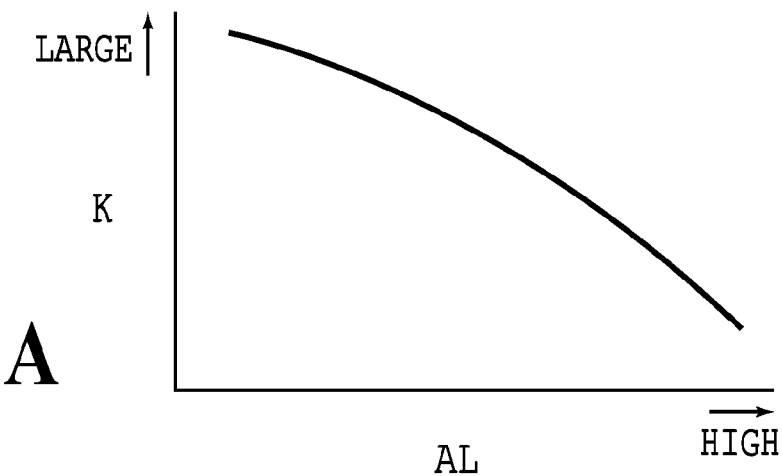
FIGS. 12A to 12C illustrate a map for calculating the correction coefficient based on the alcohol concentration.
Figure 12B:
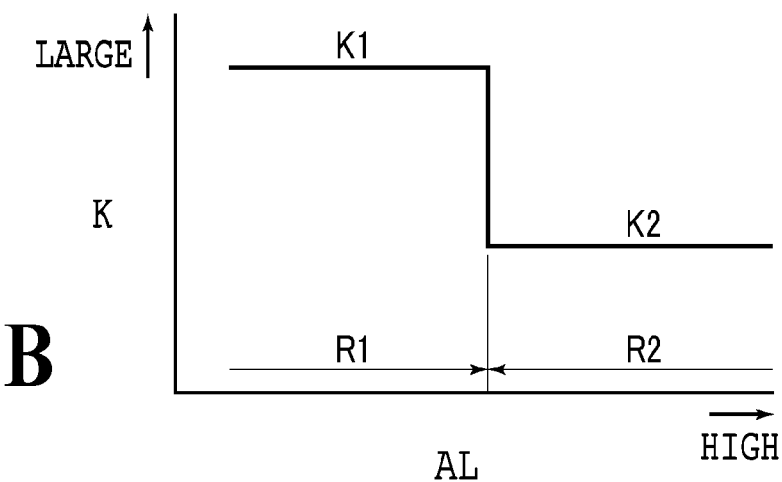
Figure 12C:
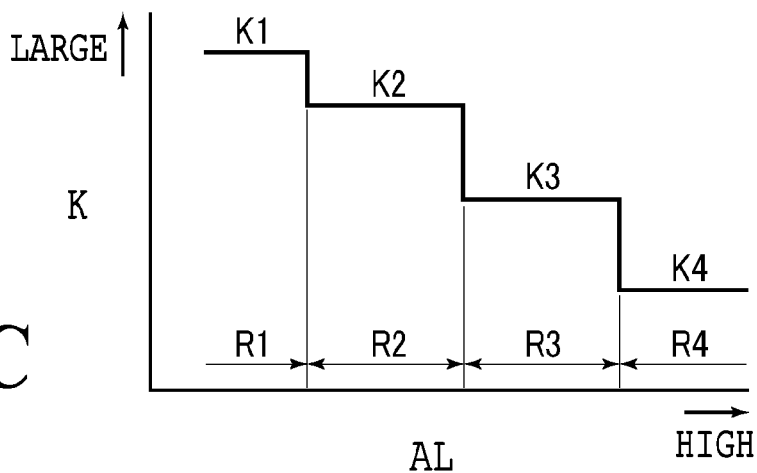

According to any of the maps shown in FIGS. 12A, 12B, and 12(C), the correction coefficient K is calculated to be smaller when the detected alcohol concentration AL is relatively high compared to when the detected alcohol concentration AL is relatively low. The reason is that, as already described with reference to FIG. 4 and FIG. 5, when the alcohol concentration AL is relatively high, the defective valve closing of the exhaust valve due to condensation liquid is suppressed from occurring compared to when the alcohol concentration AL is relatively low. Thus, the motoring time tm is set to be shorter when the alcohol concentration AL is relatively high compared to when the alcohol concentration AL is relatively low. Thus, the motoring time tm can be set to an optimal minimum required time, thereby minimizing the power consumption due to the motoring.

In the map shown in FIG. 12A, the correction coefficient K is set to be lower in accordance with an increase of the alcohol concentration AL. In particular, the correction coefficient K is gradually and continuously (or proportionally) reduced in accordance with an increase of the alcohol concentration AL. Thus, the final motoring time tm is also set to be shorter in accordance with an increase of the detected alcohol concentration AL. In particular, the final motoring time tm is gradually and continuously (or proportionally) reduced in accordance with an increase of the detected alcohol concentration AL. According to this, the motoring time tm can be minutely set in accordance with the detected alcohol concentration AL.

In the map shown in FIG. 12B, the correction coefficient K is set in a stepwise manner depending on the alcohol concentration AL. Specifically, the region of the alcohol concentration AL is divided to two regions of a low concentration region R1 and a high concentration region R2. The respective regions have correction coefficients K1 and K2 (where K1>K2) set to a fixed value. Thus, the final motoring time tm is changed in two steps in accordance with an increase of the detected alcohol concentration AL and is reduced in a stepwise manner at a boundary between the low concentration region R1 and the high concentration region R2. Then, the motoring time tm when the detected alcohol concentration AL is in the high concentration region R2 is set to be shorter than the motoring time tm when the detected alcohol concentration AL is in the low concentration region R1. According to this, when compared with a case where the map shown in FIG. 12A is used, the processing to calculate the correction coefficient K and the motoring time tm can be simplified.

The map shown in FIG. 12C is obtained by changing the map shown in FIG. 12B to have more steps. In the map shown in FIG. 12C, the region of the alcohol concentration AL is divided to four regions R1 to R4. The respective regions have correction coefficients K1 to K4 set to fixed values (where K1>K2>K3>K4). In accordance with an increase of the alcohol concentration AL, the correction coefficient K is reduced in a stepwise manner. Thus, the final motoring time tm is changed based on four steps in accordance with an increase of the detected alcohol concentration AL and is reduced in a stepwise manner at the boundary between the respective regions. According to this, the minute setting of the motoring time tm and the simplified calculation processing can be balanced in a preferable manner.

A map other than those shown in FIGS. 12A, 12B, and 12C also can be used. For example, the curve of the map having a continuous characteristic shown in FIG. 12A also can be changed to a straight line or another curve.

The similar approach can be applied to change the maps shown in FIGS. 10 and 11 to have a stepwise characteristic.

Returning to FIG. 9, in Step S109, the motoring is carried out. As described earlier, the first motor MG1 is turned ON and the engine 1 is driven by the first motor MG1 to rotate.

In Step S110, the above-described resistance reduction control is carried out together with the motoring.

In Step S111, whether or not the motoring time tm has passed since the start of the motoring is determined. When the motoring time tm has not passed since the start of the motoring, the processing returns to Step S109 and the motoring and the resistance reduction control are carried out continuously.

When the motoring time tm has passed, the processing proceeds to Step S112 in which the motoring and the resistance reduction control are completed or stopped.

The basic embodiment of this embodiment has been described above. However, this embodiment also can be subjected to a modification as shown below.

(1) In the above basic embodiment, whether the engine is low-temperature started or not is determined based on the outside temperature at the engine stop. However, the invention is not limited to this. For example, this determination may be carried out based on at least one of the outside temperature at the engine stop, the water temperature at the engine stop, the outside temperature at the engine start, and the water temperature at the engine start. Then, it is determined that the engine is low-temperature started when at least one of these temperatures is equal to or lower than a temperature causing the above-described the defective valve closing of the exhaust due to the freezing of the condensation liquid (i.e., the above predetermined temperature α).

(2) The resistance reduction control was carried out using the intake side VVT 21 in the above basic embodiment. However, an exhaust side VVT may be alternatively or additionally used. Alternatively, instead of the reduction of the compression resistance, the overlap amount of the intake air/exhaust valve also can be controlled for example so that the intake air/exhaust resistance can be reduced. A variable valve mechanism also can be used in which the valve lift is variable in addition to the valve timing of the intake air/exhaust valve.

In the case of an engine including a turbo charger, a bypass valve is provided to open or close a bypass passage to bypass a turbine. However, the bypass valve may be opened in order to reduce the exhaust resistance during the execution of the resistance reduction control. When the engine has an exhaust throttle in an exhaust passage, the exhaust throttle valve may be opened during the execution of the resistance reduction control in order to reduce the exhaust resistance.

The above respective controls for the resistance reduction control (e.g. the control of the intake side VVT 21, the control of the throttle valve 10) may be carried out individually or in combination.

(3) In the above basic embodiment, the basic motoring time tmb was determined based on both of the outside temperature Ta and the accumulated intake air amount ΣGa (Step S106). However, the basic motoring time tmb may be determined based on at least one of them.

(4) The engine may be a compression firing-type internal combustion engine (i.e. a diesel engine) and reference fuel may be light oil.

Second Embodiment

Next, the second embodiment of the present invention will be described. The same parts as those of the first embodiment will not be described further. Thus, a difference therebetween will be mainly described.

Figure 13:
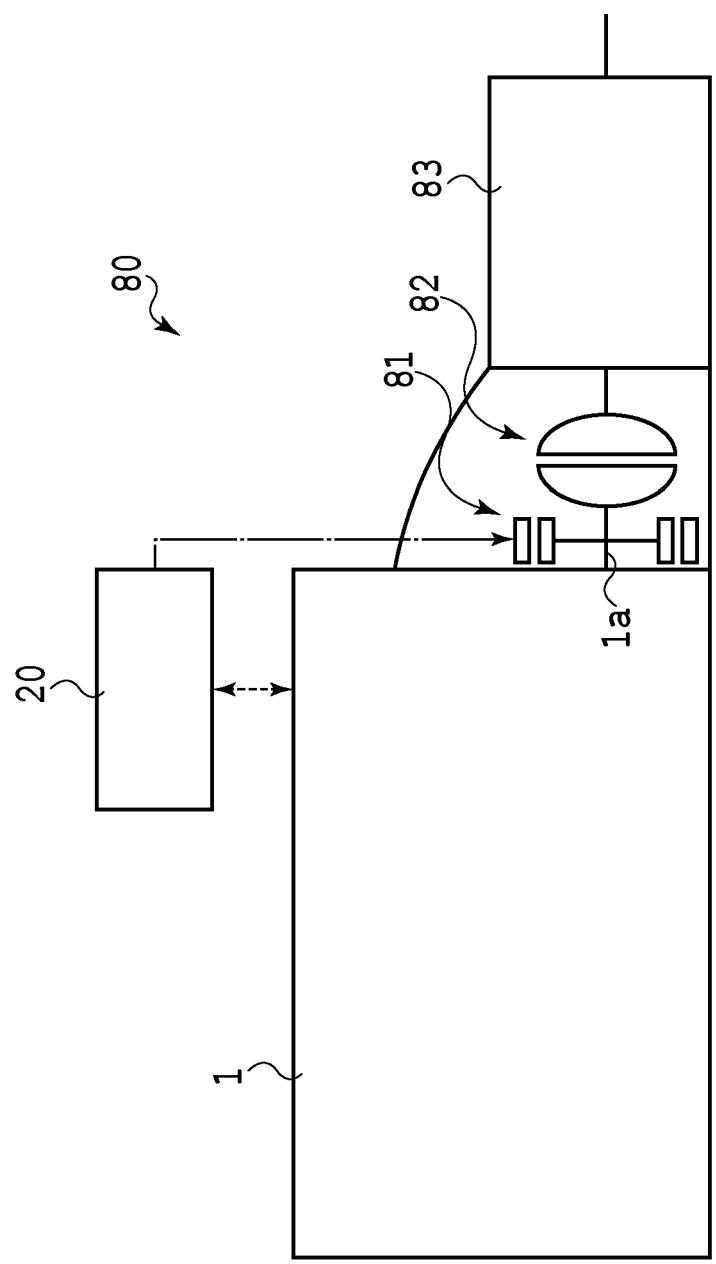
FIG. 13 is a schematic view illustrating the hybrid vehicle according to the second embodiment.

As described in FIG. 13, the vehicle of this embodiment is a hybrid vehicle 80 that is different from the hybrid vehicle 50 of the first embodiment. The hybrid vehicle 80 of this embodiment has a motor generator 81 that is directly provided on the crank shaft 1a of the engine 1 to assist the power of the engine 1. This motor generator 81 functions as an electric motor to drive the engine 1 during the above motoring. At the downstream side of the motor generator 81, the crank shaft 1a is connected to the wheel side via a torque converter 82 and an automatic transmission 83. Specifically, the hybrid vehicle 80 of this embodiment is an automatic transmission car.

In the case of this configuration, the engine 1 is not always connected to the wheel side via at least a gear mechanism in a power transmittable manner. The reason is that the former and the later have therebetween the torque converter 82 to absorb the power from the engine 1 and the automatic transmission 83 having a neutral or parking position at which power can be cut. Thus, this does not cause a defect in which misfire based on the defective valve closing of the exhaust valve immediately vibrates the vehicle. However, when the misfire due to the defective valve closing of the exhaust valve occurs, it is clear that defects such as abnormal exhaust noise, abnormal vibration, a reduced engine efficiency, or deteriorated emission occur. Thus, this embodiment is effective in order to suppress these defects.

Third Embodiment

Figure 14:
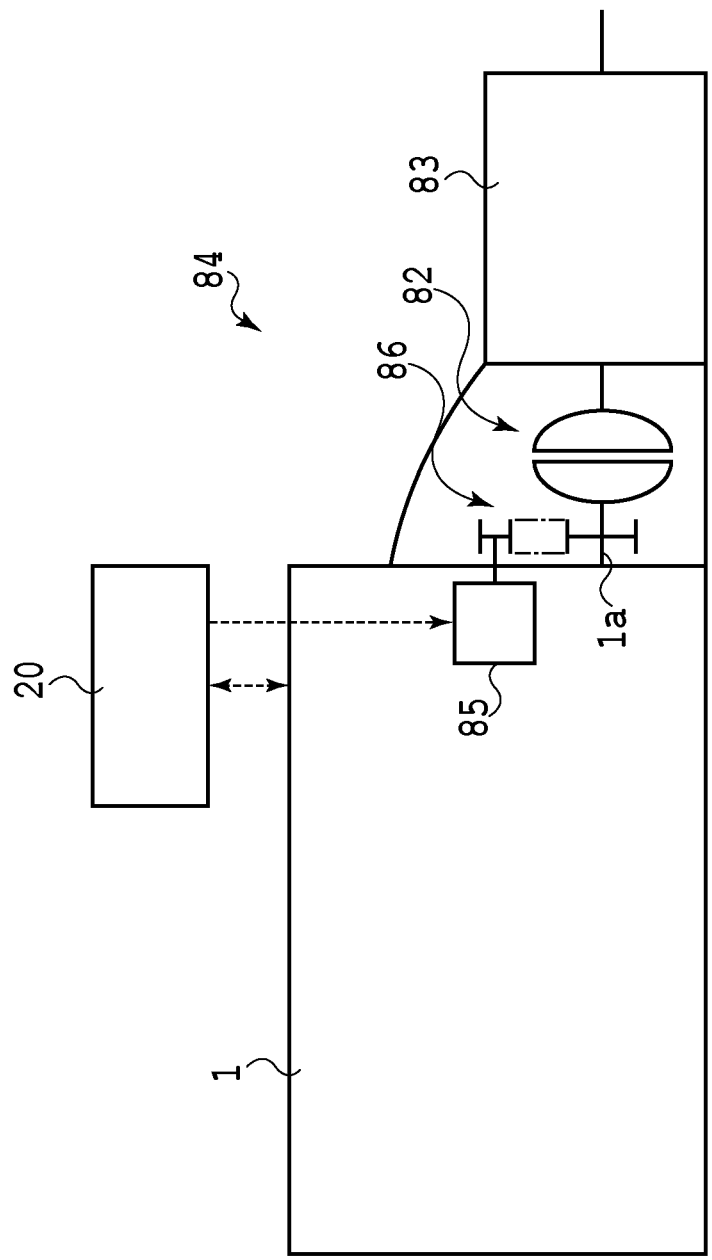
FIG. 14 is a schematic view illustrating the hybrid vehicle according to the third embodiment.

Next, the following section will describe the third embodiment of the present invention. As shown in FIG. 14, the hybrid vehicle 84 of this embodiment is also different from the hybrid vehicle of the embodiment. The hybrid vehicle 84 of this embodiment has the motor generator 85 that mainly functions as a power generator and that supplementarily functions as an electric motor. The motor generator 85 generates a relatively-small power to assist the power of the engine 1. This motor generator 85 functions as an electric motor to drive the engine 1 during the above motoring. The motor generator 85 is connected to the crank shaft 1*a* via a power transmission mechanism (e.g., a belt pulley mechanism 86). The downstream side of the motor generator 85 has the same configuration as that of the second embodiment.

Also in the case of this configuration, the engine 1 is not always connected to the wheel side via a gear mechanism in a power transmittable manner. However, this embodiment is effective due to the reason similar to the above-described one.

Fourth Embodiment

Figure 15:
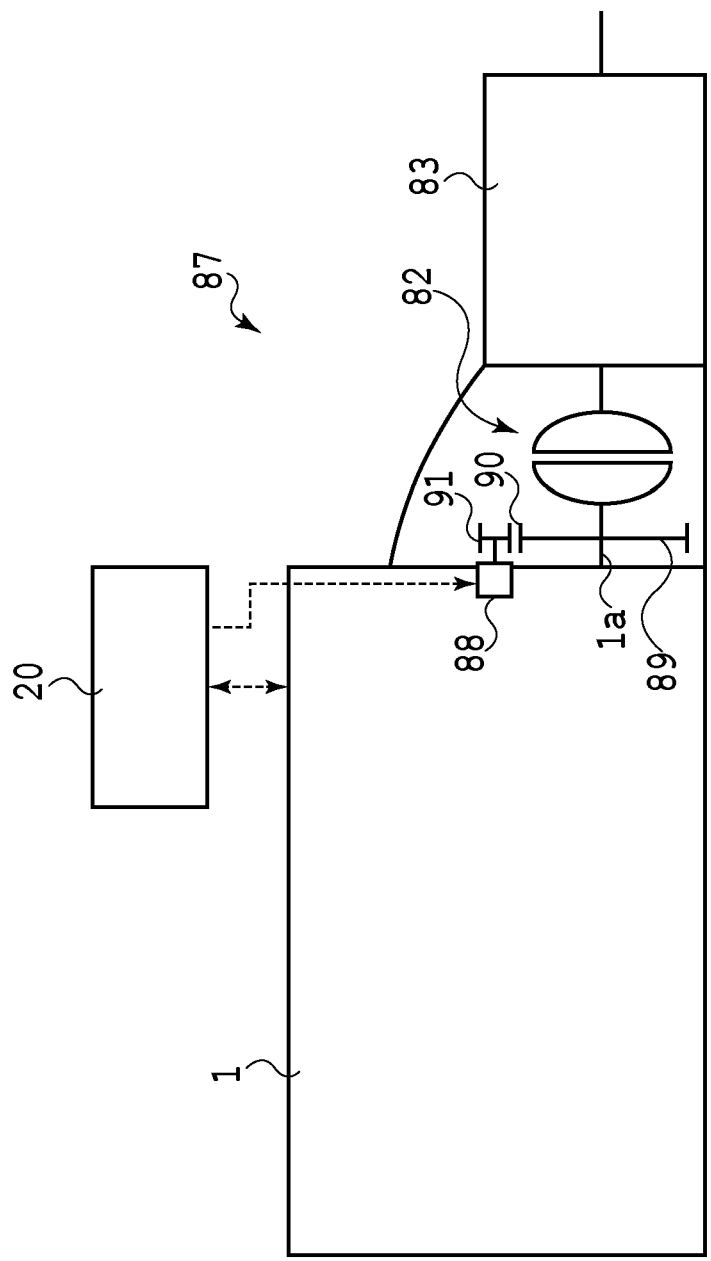
FIG. 15 is a schematic view illustrating the hybrid vehicle according to the fourth embodiment.

Next, the fourth embodiment of the present invention will be described. As shown in FIG. 15, the vehicle 87 of this embodiment is not a hybrid vehicle but a general vehicle and includes the engine 1 as a single power source. As described above, the present invention also can be applied to a vehicle other than a hybrid vehicle. The engine 1 includes a starter motor 88 for starting. This starter motor 88 functions as an electric motor to drive the engine 1 during the above motoring. As well known, a flywheel 89 attached to the crank shaft 1*a* and the rotation axis of the starter motor 88 have gears 90 and 91. The starter motor 88 is moved to be close to the flywheel 89 during the engine start and the motoring so that these gears 90 and 91 are engaged to each other. The downstream side of the flywheel 89 has a similar configuration as that of the second embodiment.

Also in the case of this configuration, the engine 1 is not always connected to the wheel side via the gear mechanism in a power transmittable manner. However, this embodiment is effective due to the reason like the above-described one.

As described above, a preferred embodiment of the present invention has been described in detail. However, various other embodiments of the present invention also may be considered. The above numerical values are merely illustrative and can be appropriately changed. The present invention also can be applied to a manual transmission car.

The embodiment of the present invention is not limited to the above-described embodiment. The invention includes any of modifications, applications, and equivalents included in the concept of the present invention defined by claims. Thus, the present invention should not be interpreted in a limited manner and also can be applied to arbitrary techniques within the scope of the concept of the present invention.

What is claimed is:

1. A control apparatus for an internal combustion engine in which alcohol fuel can be used, comprising:

an acquisition unit for acquiring an alcohol concentration of fuel;

an electric motor for driving the internal combustion engine; and a control unit configured to control the internal combustion engine and the electric motor, wherein the control unit is configured, when a running time from a low-temperature start to a stoppage of the internal combustion engine or a parameter increasing with an increase of the running time is equal to or lower than a predetermined value, to cause, after the stoppage of the internal combustion engine, the electric motor to subject the internal combustion engine to motoring and to set the motoring time of the motoring to be shorter when the alcohol concentration of the fuel acquired by the acquisition unit is relatively high compared to when the alcohol concentration of the fuel acquired by the acquisition unit is relatively low.

2. The control apparatus for the internal combustion engine according to claim 1, wherein: the control unit sets the motoring time to be shorter when the running time or the parameter is relatively low compared to when the running time or the parameter is relatively high.

3. The control apparatus for the internal combustion engine according to claim 1, wherein: the control unit sets the motoring time to be shorter when an outside temperature is relatively high compared to when the outside temperature is low.

4. The control apparatus for the internal combustion engine according to claim 1, wherein: the control unit carries out a resistance reduction control to reduce, during the motoring, at least one of an intake resistance, a compression resistance, and an exhaust resistance.

5. The control apparatus for the internal combustion engine according to claim 1, wherein: the parameter is an accumulated intake air amount calculated in a period from the low-temperature start of the internal combustion engine to the stoppage.

6. The control apparatus for the internal combustion engine according to claim 5, wherein: the predetermined value for the parameter has a higher value when the outside temperature is relatively low compared to when the outside temperature is relatively high.

7. The control apparatus for the internal combustion engine according to claim 1, wherein: the internal combustion engine is mounted in a hybrid vehicle and the internal combustion engine is always connected to a gear mechanism of the hybrid vehicle in a power transmittable manner.

\* \* \* \* \*